H. H. SILER & T. A. BROOKS.
Apple Slicer and Corer.
No. 161,359.                                    Patented March 30, 1875.
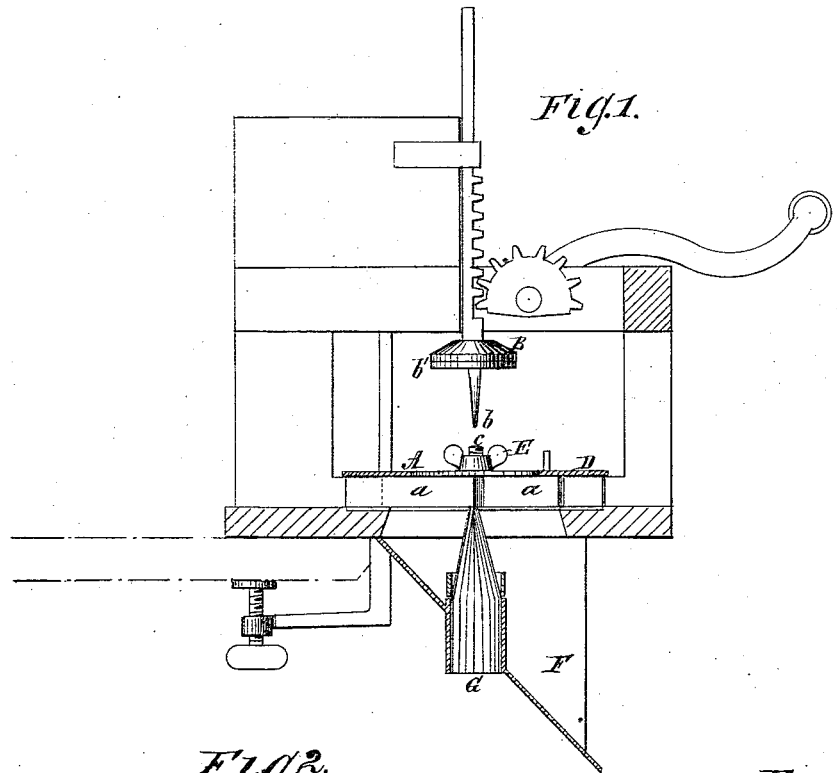
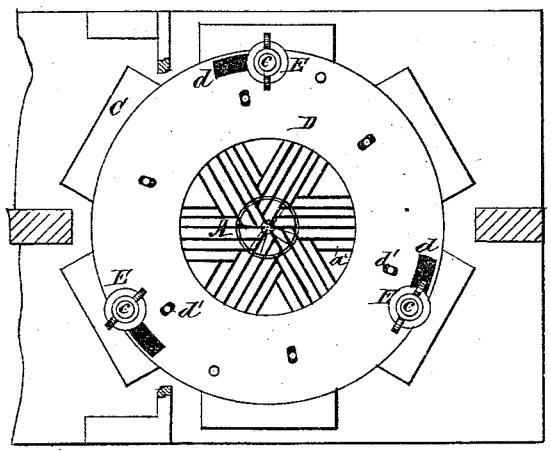
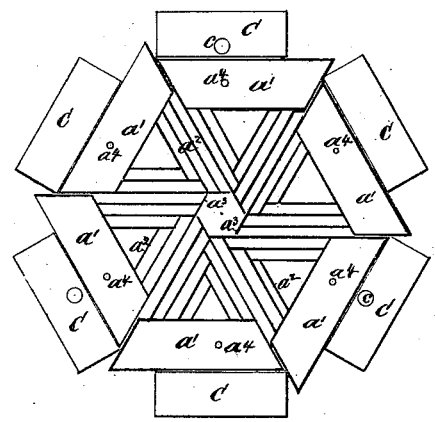

UNITED STATES PATENT OFFICE.

HENRY H. SILER AND THOMAS A. BROOKS, OF ST. LAWRENCE, ASSIGNORS TO THEMSELVES AND JAMES D. BROOKS, OF RALEIGH, N. C.

IMPROVEMENT IN APPLE SLICERS AND CORERS.

Specification forming part of Letters Patent No. 161,359, dated March 30, 1875; application filed August 21, 1874.

*To all whom it may concern:*

Be it known that we, HENRY H. SILER and THOMAS A. BROOKS, of St. Lawrence, in the county of Chatham and State of North Carolina, have invented a new and Improved Apple Slicer and Corer; and we do hereby declare that the following is a full, clear, and exact description of the same, reference being had to the accompanying drawing forming a part of this specification, in which—

Figure 1 is a sectional elevation; Fig. 2, a plan view of the slicing-cutters; Fig. 3, a plan view of the knives arranged both to core and slice.

The invention relates to, and consists in, novel means for coring and slicing fruit and vegetables, as hereinafter described.

A represents the cutter-bed upon which the fruit or vegetable rests; and B the reciprocating plunger, whose point $b$ centers while its flat head $b'$ presses it over and through the cutters. The cutter-bed is made in several equal triangular sections, $a$, having base $a^1$, and a series of knives, $a^2$, the interval between the knives being made to correspond to the thickness of slice required. At the angle of the outside knife of each section projects a core-knife, $a^3$, all to the right or all to the left, so as to form a small interior polygonal space similar to that formed by the outline of the bases of the section. C is a series of blocks, against which the sections slide and are supported; and $c$, a screw uprising from each block and passing through an arc-slot, $d$, of the ring-plate D. The latter has also a series of perforations, $d'$, arranged in a circle, and in these are pivoted the cutter-sections $a$ by a fulcrum-pin, $a^4$. By turning the plate D to the right as far as the slot $d$ will admit the core-knives come all together in the middle, so as to excise no core from a potato or other vegetable, while, if turned to the left, a core of varying magnitude may be removed. On the screws $c$ are used clamp-nuts E. F is a spout under the knives to receive the slices as they drop, and convey them to a receptacle, while through this the core passes in a discharge-tube, G.

It will be perceived that a rack and pinion, or other mechanism operated by hand, will core and slice fruit simultaneously, doing the work with perfect uniformity, so that the fruit will all dry alike while it is accomplished with the least possible labor and expenditure of time.

Having thus described our invention, what we claim as new is—

1. The series of cutters $a^3$, arranged as shown on knives $a^2$, as and for the purpose specified.

2. The combination, with base blocks C, of cutter-bed sections $a$, arranged to slide on each other and on the base-blocks, as and for the purpose described.

3. The combination, with ring-plate D, having slots $d$ and perforations $d'$ arranged in a a circle, of the cutter-bed sections $a$, provided with pins $a^4$, to enable the core-cutters to be moved by the plate to or from the center.

HENRY H. SILER.
THOMAS A. BROOKS.

Witnesses:
JOHN MANNING,
WILLIAM HACKNEY.